United States Patent
Kiesel

[11] Patent Number: 6,003,886
[45] Date of Patent: Dec. 21, 1999

[54] ADJUSTABLE VEHICLE-LOWERING REAR LATERAL ARM

[75] Inventor: David P. Kiesel, Fresno, Calif.

[73] Assignee: Suspension Technologies, Inc., Fresno, Calif.

[21] Appl. No.: 09/181,714

[22] Filed: Oct. 28, 1998

[51] Int. Cl.$^6$ .................................................. B62D 17/00
[52] U.S. Cl. .............................. 280/86.757; 280/86.75; 280/86.751; 280/124.134
[58] Field of Search ................. 280/86.757, 86.75, 280/86.751, 86.752, 86.758, 124.134, 5.52, 5.521, 5.522, 5.524

[56] References Cited

U.S. PATENT DOCUMENTS

| | | |
|---|---|---|
| 2,115,915 | 5/1938 | McCain . |
| 3,199,837 | 8/1965 | Vestal et al. . |
| 3,938,822 | 2/1976 | Guerriero . |
| 5,284,353 | 2/1994 | Shinji et al. ........................ 280/86.751 |

FOREIGN PATENT DOCUMENTS

| | | | |
|---|---|---|---|
| 713935 | 10/1941 | Germany | ............................... 280/112 |
| 437255 | 7/1991 | Japan | .................................... 280/112 |
| 3-213410 | 9/1991 | Japan | .................................... 280/112 |

*Primary Examiner*—Eric Culbreth
*Attorney, Agent, or Firm*—Mark D. Miller

[57] ABSTRACT

Disclosed is a rear lateral arm for lowering the body of a vehicle which includes a mechanism which can be adjusted to compensate for the excessive negative camber associated with such lowering. The adjustment mechanism is in the form of a modified turnbuckle built into the lateral arm. The turnbuckle allows adjustment of the horizontal distance between the vehicle chassis and the wheel mount, thereby allowing adjustment of the camber of the rear wheels. After a suitable adjustment has been made, locking nuts are engaged to prevent further movement of the turnbuckle.

11 Claims, 5 Drawing Sheets

ADJUSTABLE VEHICLE-LOWERING REAR LATERAL ARM

BACKGROUND OF THE INVENTION

1. Field of the Invention.

The present invention relates to vehicle suspension systems, and more particularly to a new vehicle-lowering, adjustable rear lateral arm.

2. Description of the Prior Art

For well over a decade, there has been an ever increasing popularity of light utility sport trucks and related vehicles. With this popularity has come the desire to customize such small trucks and automobiles. It is particularly popular to customize the suspensions of popular vehicles in order to bring the bodies of such vehicles closer to the ground. Over the years, numerous front and rear suspension systems have been developed to "drop" the vehicle down closer to the ground.

There are numerous ways to modify the rear suspension system of a vehicle in order to lower the rear end. One such method is the use of a modified lateral arm which, instead of being straight, includes an elbow-like bend. This bend allows the rear vehicle height to be lowered by up to 1½ inches.

One of the most significant drawbacks to the use of rear lateral arms is the effect on the camber of the rear wheels. In particular, vehicle-lowering rear lateral arms cause excessive negative camber: the distance between the tops of the two rear wheels is made significantly shorter than the distance between the bottoms of those same wheels. Such excessive negative camber may cause excessive and uneven wear on the rear wheel tires, especially on the inside corners thereof. Negative camber may result in rubbing of the tire against the vehicle fender. It may also affect turning, stopping and overall handling of the vehicle.

It is therefore desirable to provide a mechanism for lowering the rear of a vehicle without causing excessive negative camber.

SUMMARY OF THE INVENTION

The present invention is a new and improved rear lateral arm for lowering the body of a vehicle which includes a mechanism which can be adjusted to compensate for the excessive negative camber associated with such lowering. The adjustment mechanism is in the form of a modified turnbuckle built into the arm. The turnbuckle allows adjustment of the horizontal distance between the vehicle chassis and the wheel mount, thereby allowing adjustment of the camber of the wheel itself.

In use, the straight lateral arms supplied with the vehicle are removed, and replaced by the elbow-shaped vehicle chassis-lowering lateral arms of the present invention which include the adjustable turnbuckle section. For each wheel, one end of the lowering arm is attached to the wheel mount, and the opposite adjustable end is attached to the vehicle chassis. The lowermost elbow section of the lowering arm is attached to the rear strut assembly and coil spring. This initial installation results in significant negative camber in the wheels. The turnbuckles of each arm are then rotated to adjust the camber back to within the tolerances and specifications of the vehicle. The result is a vehicle having a lowered rear end without excessive negative camber.

It is therefore a primary object of the present invention to provide an adjustable, vehicle body-lowering lateral arm capable of compensating for the negative camber associated with lowering the chassis of the vehicle.

It is also an important object of the present invention to provide a method for lowering the rear chassis of a vehicle while also compensating for the negative camber associated therewith.

Additional objects of the invention will be apparent from the detailed descriptions and the claims herein.

DETAILED DESCRIPTION OF THE PREFERRED EMBODIMENTS

Figure 1:
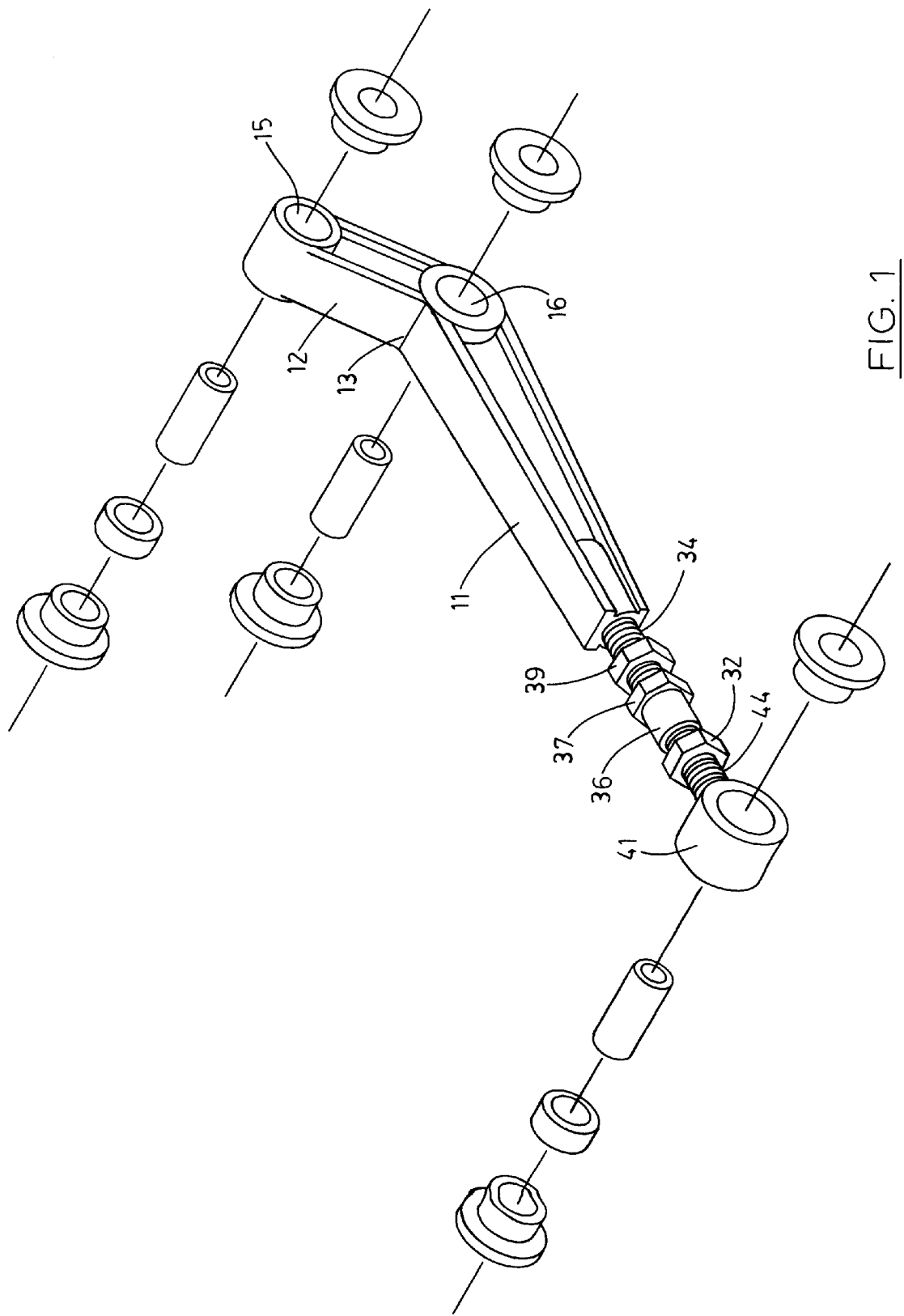
FIG. 1 is a perspective, partially exploded view of the adjustable lateral arm of the present invention.
Figure 3:
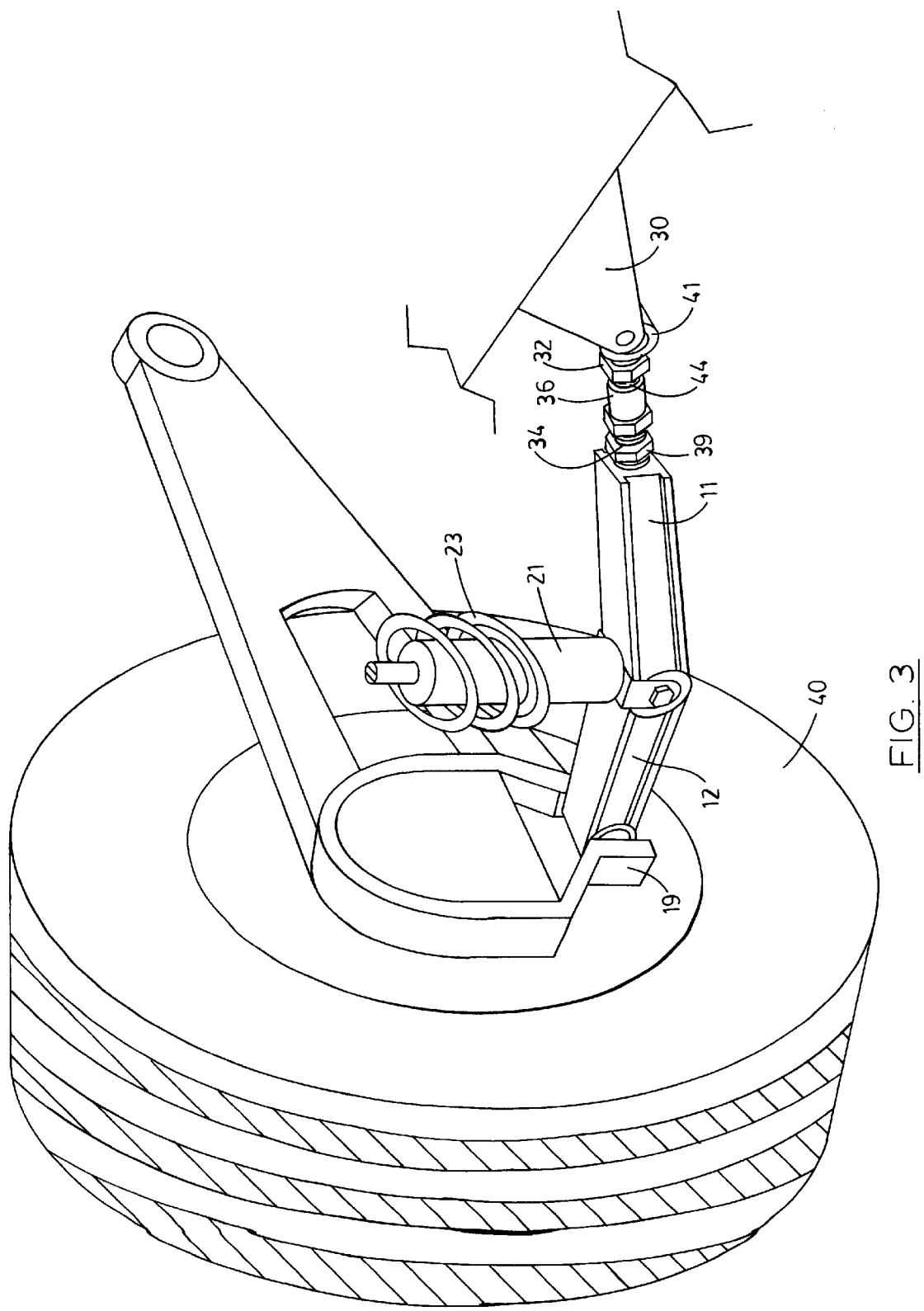
FIG. 3 is a perspective environmental view of the invention showing installation on a vehicle.

Referring to the drawings wherein like reference characters designate like or corresponding parts throughout the several views, and referring particularly to FIGS. 1 and 3 it is seen that the invention includes a metallic lowering arm having an elongated inner segment 11 and a shorter outer segment 12 separated by an elbow-shaped angular connection 13. An opening 15 is provided at the end of arm segment 12 for receiving bushings and other means for attachment to a wheel mount 19 of a vehicle. Another opening 16 is provided at elbow connection 13 for attachment to a strut assembly 21 and coil spring 23 of the vehicle.

Figure 2:
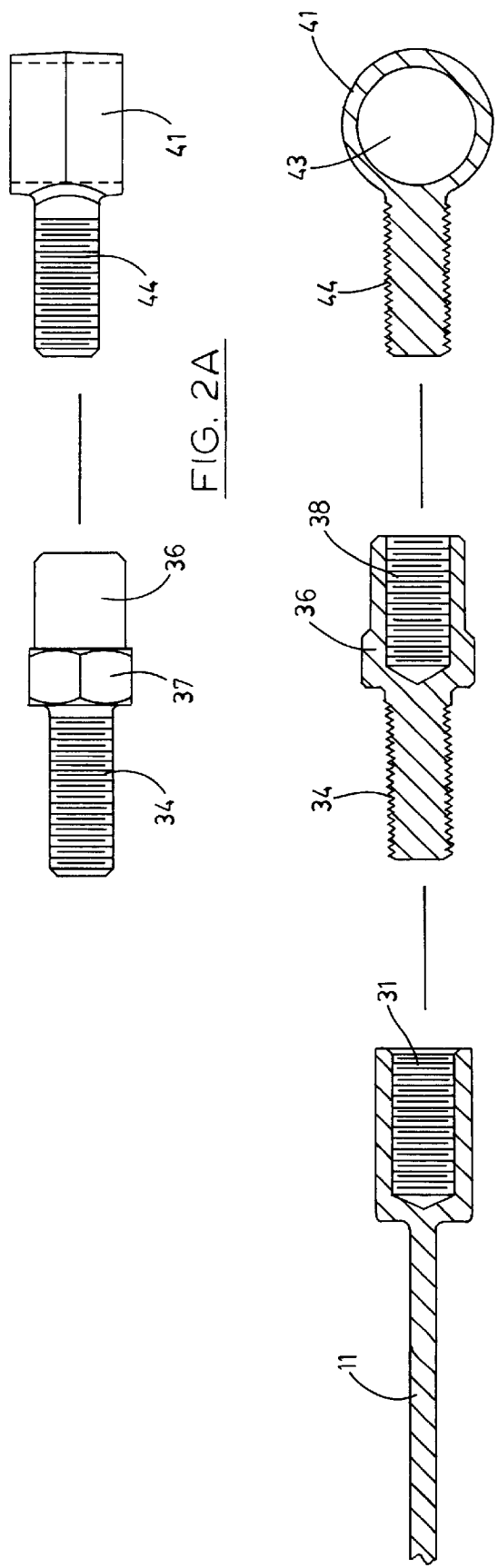
FIG. 2A is a side view of the turnbuckle parts of the present invention.
FIG. 2B is an exploded cut-away side view of the principal parts of the present invention, rotated 90 degrees from the view of FIG. 2A.

Referring to FIG. 2B, it is seen that a helically threaded bore hole 31 is provided at the opposite end of arm segment 11. A turnbuckle member 36 is provided which includes a helically threaded extension 34 for threadable insertion into hole 31 of arm segment 11. A lock nut 39 is threadably provided on extension 34. An oppositely threaded helical bore hole 38 is provided at the opposite end of member 36. A chassis attachment member 41 is provided having an opening 43 for attachment to the chassis of a vehicle. Member 41 also includes a helically threaded extension 44 for threadable insertion into bore hole 38 of turnbuckle member 36. A lock nut 32 is threadably provided on extension 44.

In use, two lateral arms are installed simultaneously, one on each of the rear wheels of the vehicle. The parts of each lateral arm are assembled together, such that extensions 34 are threadably inserted into bores 31 with lock nuts 39 also threaded thereon. Extensions 44 are threadably inserted into bores 38 with lock nuts 32 also threaded thereon. Wheel mounts 19 are then attached at openings 15; strut assemblies 21 are attached at openings 16; and the vehicle chassis 30 is attached at openings 43.

Figure 4:
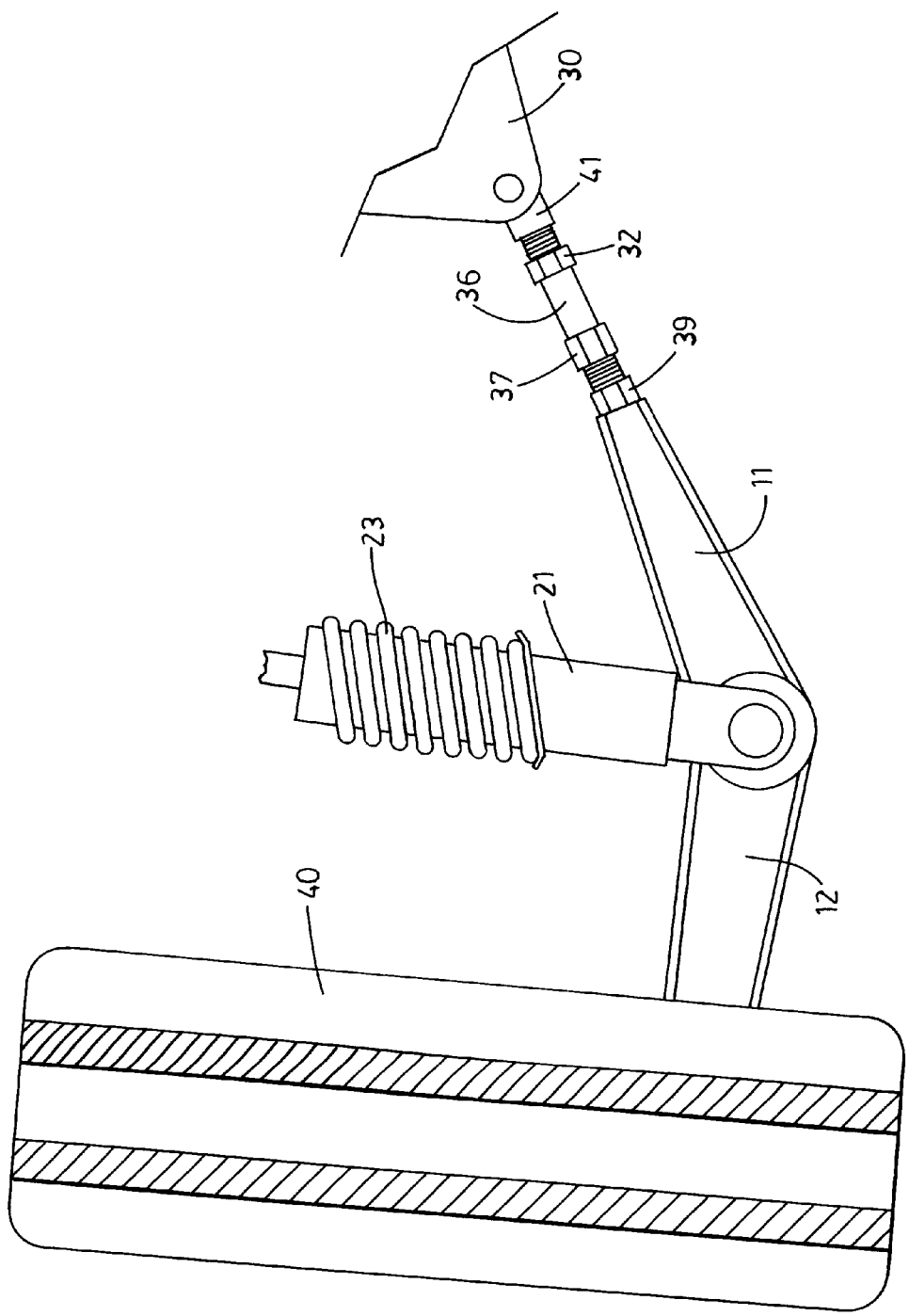
FIG. 4 is a rear view of a vehicle in which the adjustable lateral arm of the present invention has been installed prior to adjustment, illustrating negative camber.
Figure 5:
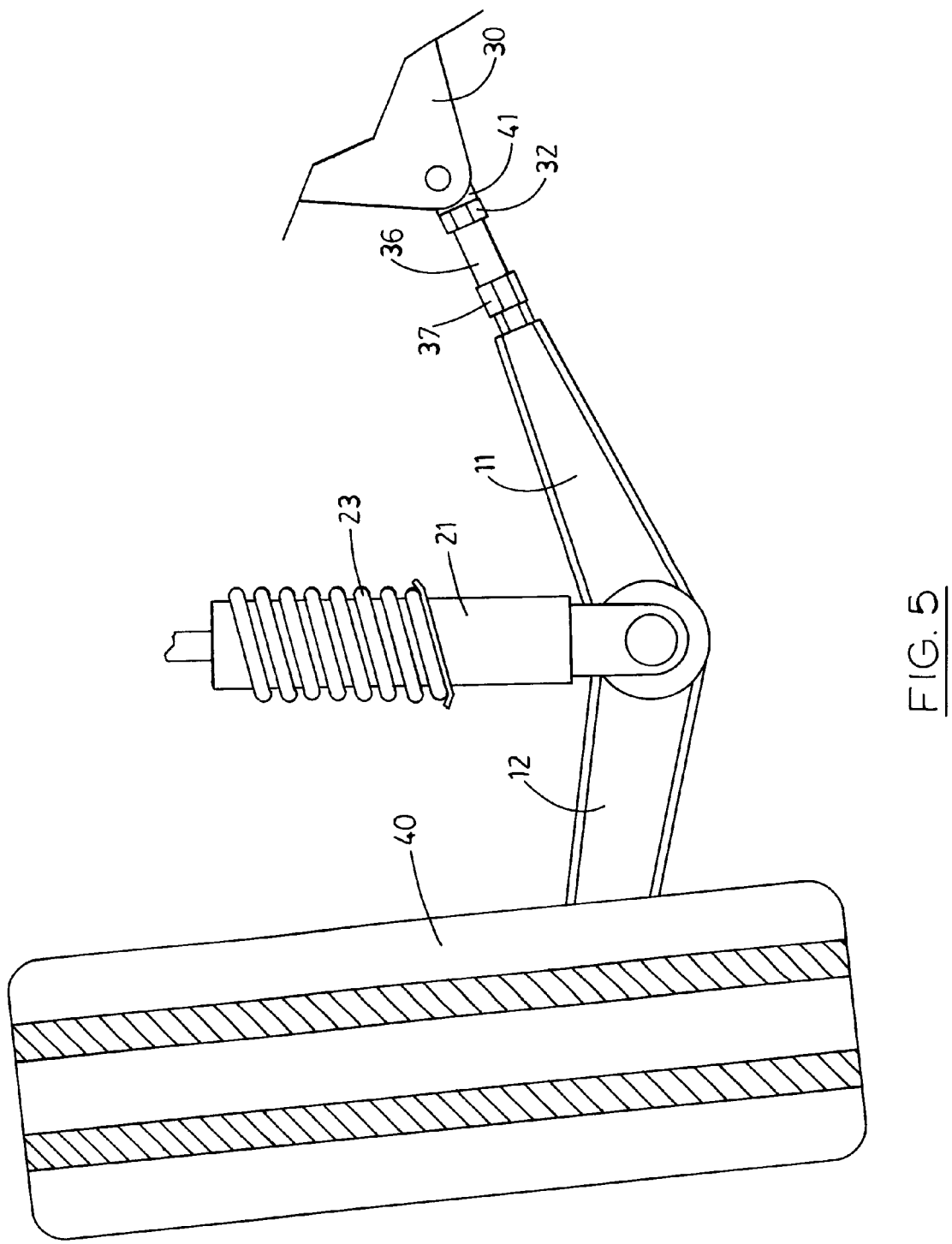
FIG. 5 is a rear view of a vehicle in which the adjustable lateral arm of the present invention has been installed after an adjustment, illustrating positive camber.

Next, turnbuckle members 36 are rotated at nut 37 using a wrench or other suitable device. Rotation of member 36 in a clockwise direction causes arm segment 11 to be pulled toward chassis support member 41, thereby bringing wheel mount 19 (and hence, the lower section of the wheel 40) horizontally closer to chassis 30 thereby decreasing negative camber (see FIG. 5). Rotation of member 36 in the opposite direction moves arm segment 11 and support member 41 apart, thereby moving wheel mount 19 horizontally away from chassis 30 and increasing negative camber (see FIG. 4).

Members 36 on each rear lateral arm are rotated until a suitable camber of wheels 30 is reached. At that point, locking nuts 32 are tightly engaged against turnbuckle members 36, and locking nuts 39 are tightly engaged against arm segments 11 to prevent each of these parts from further movement.

The lateral arm of the present invention is capable of changing the camber of the wheel by as much as ten degrees (10°).

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A vehicle-lowering rear lateral arm comprising a first arm segment, one end of which is integrally connected at an angle to a second arm segment, said first segment having a helically threaded bore hole at an opposite end thereof; a turnbuckle member having a threaded extension at one end for threadable insertion into said bore hole, and an oppositely threaded helical bore hole at an opposite end thereof; and a chassis attachment member having a helically threaded extension for threadable insertion into the bore hole of said turnbuckle member, and an opening at its opposite end for attachment to the chassis of a vehicle.

2. The lateral arm described in claim 1 wherein a locking nut is threadably provided on the extension of said turnbuckle member.

3. The lateral arm described in claim 2 wherein a second locking nut is threadably provided on the extension of said chassis attachment member.

4. The lateral arm described in claim 3 wherein an opening is provided at an end of said second arm segment for attachment to a wheel mount of a vehicle.

5. The lateral arm described in claim 4 wherein another opening is provided at the connection of said first and second arm segments for attachment to a strut assembly of the vehicle.

6. A vehicle-lowering rear lateral arm comprising an elbow shaped metallic member having a helically threaded bore hole at one end thereof, a metallic turnbuckle member threadably inserted at one end into said bore hole, said turnbuckle member having an oppositely threaded helical bore hole at an opposite end, and a vehicle chassis attachment member threadably inserted into the bore hole of said turnbuckle member.

7. The lateral arm described in claim 6 wherein a locking nut is threadably provided on a threadable portion of said turnbuckle member.

8. The lateral arm described in claim 7 wherein a second locking nut is threadably provided on a threadable portion of said chassis attachment member.

9. The lateral arm described in claim 8 wherein an opening is provided at an opposite end of said elbow-shaped member for attachment to a wheel mount of a vehicle.

10. The lateral arm described in claim 9 wherein another opening is provided in the vicinity of the elbow of said metallic member for attachment to a strut assembly of a vehicle.

11. A method of adjusting camber of rear wheels of a vehicle comprising the steps of:

a. removing rear arms of said rear wheels;
b. attaching vehicle-lowering rear lateral arms to each of said rear wheels, each such lateral arm comprising: an elbow shaped metallic member attachable at one end to a vehicle wheel mount and having a helically threaded bore hole at an opposite end thereof; a metallic turnbuckle member threadably inserted at one end into said bore hole, said turnbuckle member having an oppositely threaded helical bore hole at an opposite end; and a vehicle chassis attachment member threadably inserted into the bore hole of said turnbuckle member;
c. turning the turnbuckle member of each of said lateral arms until a desired camber of the rear wheels is reached; and
d. tightening a pair of lock nuts provided at either end of each turnbuckle member to prevent further movement of the turnbuckle member.

* * * * *